United States Patent
Lambert et al.

(10) Patent No.: US 9,239,019 B2
(45) Date of Patent: Jan. 19, 2016

(54) PARTICULATE MATTER RETAINING SYSTEM

(75) Inventors: Christine Kay Lambert, Dearborn, MI (US); Martyn Vincent Twigg, Caxton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 913 days.

(21) Appl. No.: 13/359,143

(22) Filed: Jan. 26, 2012

(65) Prior Publication Data

US 2013/0192202 A1 Aug. 1, 2013

(51) Int. Cl.
| | | |
|---|---|---|
| F01N 3/00 | (2006.01) |
| F02D 19/06 | (2006.01) |
| F01N 3/021 | (2006.01) |
| F02D 41/02 | (2006.01) |
| F02D 41/12 | (2006.01) |
| F02B 75/12 | (2006.01) |
| F02D 41/00 | (2006.01) |

(52) U.S. Cl.
CPC ............ *F02D 19/0655* (2013.01); *F01N 3/021* (2013.01); *F02D 41/029* (2013.01); *F02D 41/12* (2013.01); *F01N 2330/02* (2013.01); *F01N 2330/22* (2013.01); *F02B 2075/125* (2013.01); *F02D 19/0642* (2013.01); *F02D 41/0025* (2013.01); *F02D 2200/0611* (2013.01); *F02D 2200/0812* (2013.01); *F02D 2200/0814* (2013.01); *Y02T 10/123* (2013.01); *Y02T 10/20* (2013.01); *Y02T 10/22* (2013.01); *Y02T 10/36* (2013.01)

(58) Field of Classification Search
CPC ... F02D 41/029; F02D 41/12; F02D 19/0655; F01N 3/021; F01N 2220/02; F01N 2330/22; F02B 2075/125
USPC ................................................... 60/274, 285
See application file for complete search history.

(56) References Cited

U.S. PATENT DOCUMENTS

| | | | |
|---|---|---|---|
| 8,012,244 B2 | 9/2011 | Hirth et al. | |
| 2009/0193796 A1 | 8/2009 | Wei et al. | |
| 2011/0030346 A1* | 2/2011 | Neubauer et al. | 60/274 |
| 2011/0072787 A1* | 3/2011 | Hubbard et al. | 60/276 |
| 2012/0216507 A1* | 8/2012 | Nieuwstadt | 60/274 |

FOREIGN PATENT DOCUMENTS

WO 2011015615 A1 2/2011

* cited by examiner

*Primary Examiner* — Jason Shanske
(74) *Attorney, Agent, or Firm* — Julia Voutyras; Alleman Hall McCoy Russell & Tuttle LLP

(57) ABSTRACT

Methods and systems are provided for passive regeneration of a particulate matter filter coupled to a gasoline engine. During vehicle deceleration conditions, an engine is operated leaner than stoichiometry over two subsequent lean phases, including an initial longer and leaner phase followed by a shorter and less lean phase. By passively regenerating the filter using intermittent lean engine operation, engine performance can be improved.

18 Claims, 4 Drawing Sheets

PARTICULATE MATTER RETAINING SYSTEM

FIELD

The present description relates generally to an exhaust treatment system for a combustion engine, and particularly to a particulate matter filter for gasoline engines.

BACKGROUND/SUMMARY

Engines may be configured with direct fuel injectors that inject fuel directly into a combustion cylinder (direct injection), and/or with port fuel injectors that inject fuel into a cylinder port (port fuel injection). Direct injection allows higher fuel efficiency and higher power output to be achieved in addition to better enabling the charge cooling effect of the injected fuel. Direct injected engines, however, also generate more particulate matter emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. Similarly, the injected fuel may encounter less turbulence when flowing through the valves. Consequently, there may be pockets of rich combustion that may generate soot locally, degrading exhaust emissions. In addition, particulate matter generated in gasoline direct injected engines may be finer than their diesel engine counterparts.

In some engine systems, a wall flow filter (or closed filter) may be used to filter the particulate matter from the exhaust. However, such wall flow filters may require periodic active regeneration which may adversely affect engine operation. In addition, such wall flow filters may suffer from very high back pressures, especially when coated with a catalyst. The high filter back pressure can degrade the performance of a turbocharger by reducing a pressure drop across the turbocharger. As such, this may adversely affect downsized direct injected engines that are turbocharged to provide power that is comparable to larger displacement conventional engines.

Another example of a particulate matter (PM) filter used to capture soot generated by a gasoline engine is shown by Wei et al. in US 2009/0193796. Therein, an open PM filter is included in the emission treatment system either uncoated, or coated with a suitable catalyst (e.g., a TWC catalyst) that facilitates passive regeneration of the filter.

However, the inventors herein have recognized a potential issue with such systems. As one example, the amount of catalyst loading on the filter may be limited due to backpressure constraints. The limited catalyst loading may not enable sufficient regeneration of the filter. As such, incomplete filter regeneration may reduce filter performance and degrade exhaust emissions. In addition, the limited catalyst loading may result in increased secondary emissions from the filter, such as CO from incomplete soot combustion and hydrocarbon slip. If the catalyst was on the filter to promote other reactions such as NOx reduction there could be a reduction in activity if the catalyst is blocked by soot or the activity could be limited by the smaller amount of allowable catalyst loading due to backpressure concerns.

Thus, in one example, some of the above issues may be addressed by a method comprising, during stoichiometric engine operation, flowing exhaust gas over a filter having a catalyst coating. Then, during selected conditions, shifting engine operation to leaner than stoichiometry including a first shorter and more lean phase followed by a second longer and less lean phase, the lean operation adjusted based on a catalyst oxygen content and a filter particulate matter load. In this way, particulate matter emissions from a direct injected engine can be reduced.

In one example, while a vehicle engine is operating at stoichiometry, engine exhaust may be flown over an open particulate matter filter to collect exhaust PMs, or soot. The filter may be a layered filter including at least a first catalytic coating of an oxygen storage catalyst layered on the filter substrate, and optionally a second catalytic coating (e.g., of a three-way catalyst) layered on top of the first catalytic coating. Alternatively, the catalytic coating may include a single layer of a three-way catalyst having a very high oxygen-storage catalyst content. During selected conditions, such as when the vehicle is decelerating, a lean engine operation may be opportunistically performed to passively regenerate the filter. In particular, the engine may be operated leaner than stoichiometry over a first lean phase immediately followed by a second lean phase wherein the first lean phase is shorter but more lean while the second lean phase is longer but less lean. The first lean phase may be adjusted based on a catalyst oxygen content so as to oxidize (or reoxidize) the oxygen storage catalyst of the first catalytic coating using the exhaust oxygen. In addition, some of the PMs stored on the filter may be directly oxidized. The second lean phase may then be adjusted based on the filter load as well as the first lean phase to enable the oxidized oxygen storage catalyst to complete extensive combustion of the remaining PMs stored on the filter. Overall emissions control is achieved.

As such, the periodic lean operation may be performed to passively regenerate the filter while the filter load is lower than a threshold, and reduce the likelihood of the filter load exceeding the threshold. However, if the filter load exceeds the threshold, the filter may be actively regenerated wherein stored PMs are burned to reduce backpressure caused by soot retained on the filter. For example, the active filter regeneration can occur via chemical means when excess fuel is passed over an upstream catalyst containing precious metals, causing an exotherm that actively heats the downstream filter. The fuel could be added as a late injection within the engine cylinder or via a secondary injector directly into the exhaust pipe. As still another option, the filter may be heated via external means, such as electrical heat. In one example, in the absence of any catalyst, in air, regeneration of the filter may require a temperature of around 550° C. to burn the stored soot.

In this way, a periodic leaning of engine operation may be used for sufficient passive regeneration of a PM filter. By using a first lean phase to oxidize an oxygen storage component coated on the filter, the catalyst coating may be activated while at least some PMs are burnt. By following the first lean phase with a second lean phase that uses the activated catalytic coating to oxidize the remaining PMs, the filter may be substantially completely regenerated. By reducing the need for active regeneration of the filter, wherein an additional amount of fuel is used to increase the temperature of the filter and burn off the stored soot, over-temperature related component degradation may be reduced while also improving the fuel economy of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
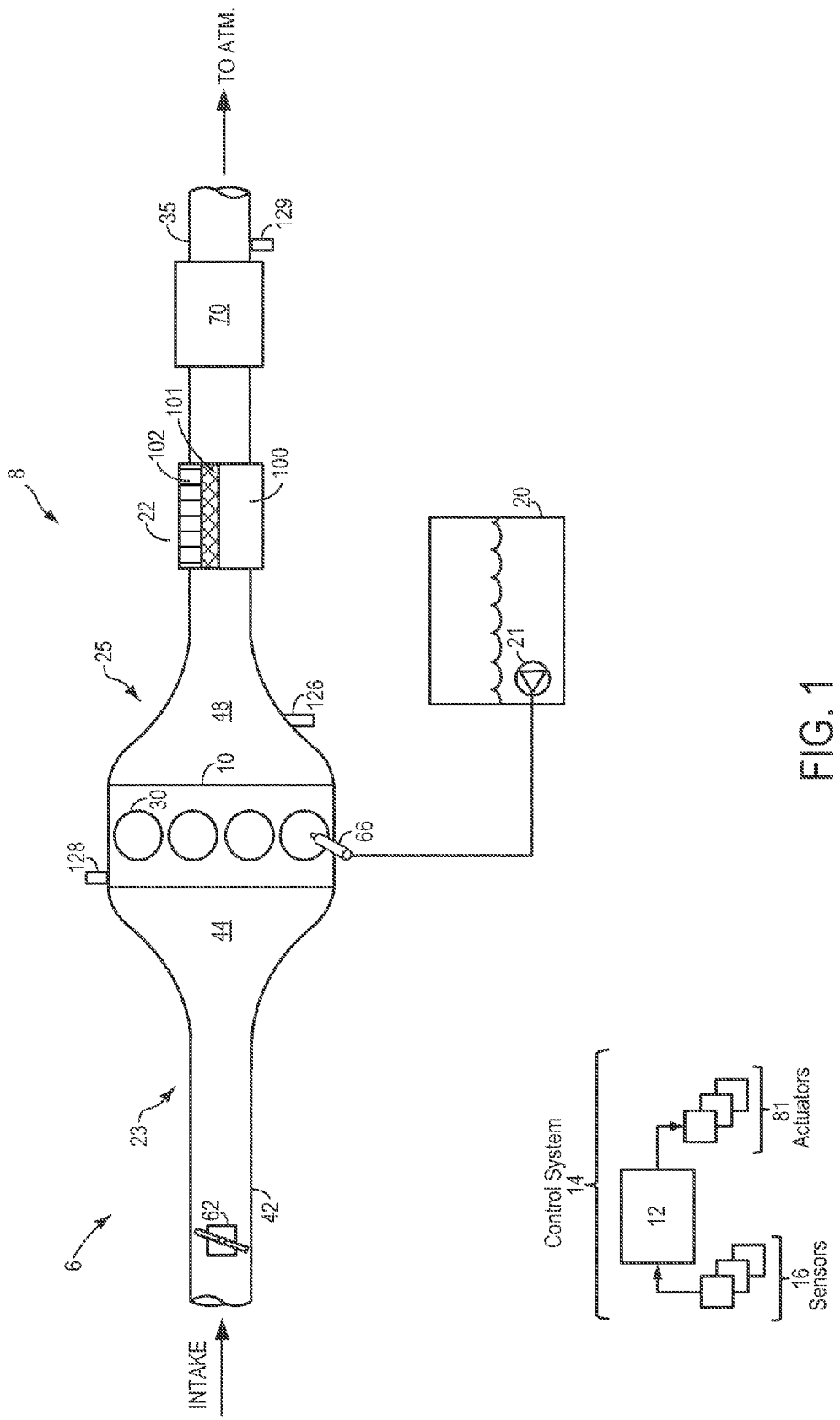
FIG. 1 shows a schematic depiction of an engine system and an associated particulate matter filter.
Figure 2:
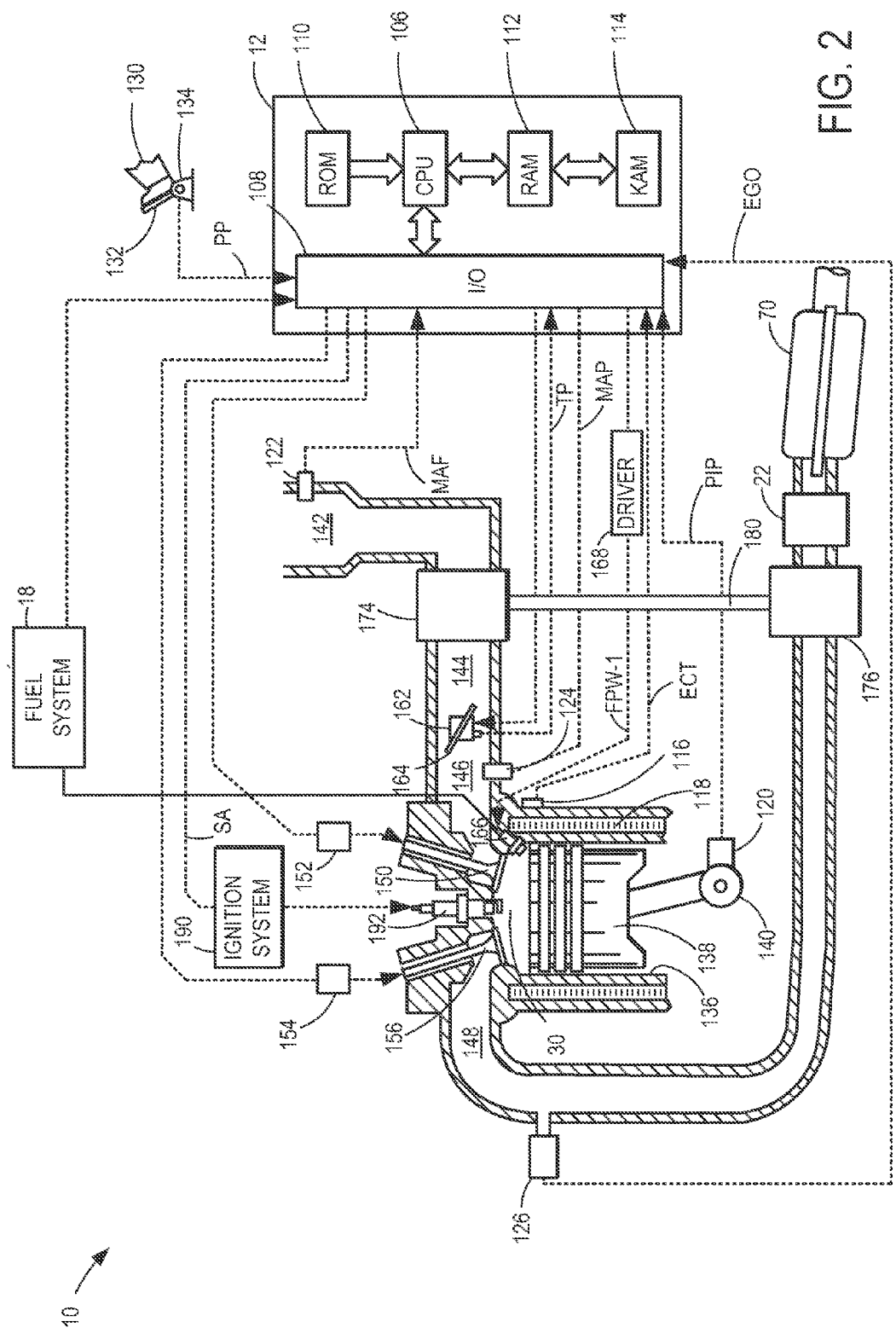
FIG. 2 shows a schematic depiction of an internal combustion engine.

The following description relates to systems and methods for operating a vehicle engine coupled to a layered particulate matter (PM) filter, such as the engine system of FIGS. 1-2. Exhaust gas from the engine may be flown over the downstream filter to store exhaust PMs therein. During selected conditions, such as during vehicle deceleration conditions, an engine controller may be configured to perform a lean engine operation so as to passively regenerate the filter. In particular, the controller may perform a routine, such as the example routine of FIG. 3, to operate the engine leaner than stoichiometry two consecutive lean phases including a first shorter and more lean phase followed immediately by a second longer and less lean phase. The brief periodic leaning may enable oxidization of a catalyst coated on the filter so that the oxidized catalyst can then oxidize the stored PMs. An example lean engine operation is depicted at FIG. 4. The periodic passive regeneration may reduce filter backpressures while also reducing the need for active regeneration of the filter. In this way, filter performance can be improved, while also improving the fuel efficiency and emissions level of the engine.

FIG. 1 shows a schematic depiction of a vehicle system 6. The vehicle system 6 including an engine system 8 coupled to a particulate matter (PM) filter 22. The engine system 8 may include an engine 10 having a plurality of cylinders 30. In one embodiment, engine 10 is a spark ignition engine. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. In some embodiments, intake passage 42 may include a boosting device, such as turbocharger or a supercharger (not shown) including a compressor coupled downstream of throttle 62, the compressor driven by a turbine in the exhaust passage coupled upstream of PM filter 22 (see FIG. 2).

Engine exhaust 25 may include PM filter 22 and one or more emission control devices 70, which may be mounted in a close-coupled position in the exhaust. The one or more emission control devices 70 may include a three-way catalyst, lean NOx filter, SCR catalyst, etc. PM filter 22 may temporarily filter PMs from exhaust gases flowing over it. In particular, PM filter may be configured as an open-flow filter storing PMs from exhaust gases flowing over it rather than a wall-flow filter storing PMs from exhaust gases flowing through it. As such, open-flow filters retain PMs and soot particles by virtue of surface protrusions such as raised steps and especially designed cup profiles with mesh retaining areas. Since the filter does not require through flow, the back-pressures generated in the filter may be substantially lower. Specifically, since the exhaust gas passes over and around the surface protrusions, the open flow filters do not have intrinsically high back pressures as found in ceramic or porous metal wall flow filters (or closed filters). Exhaust gas that has been filtered upon passage through PM filter 22 may be further processed by downstream catalysts and emission control device 70 for expulsion to the atmosphere. While the depicted embodiment shows emission control device 70 downstream of PM filter 22, in an alternate embodiment, emission control device 70 may be positioned upstream of PM filter 22.

In one embodiment, PM filter 22 may be a layered filter including a filter substrate 100 onto which one or more catalytic coatings are layered. In the depicted embodiment, a first catalytic coating 101 is layered onto filter substrate 100 while a second catalytic coating 102 is layered on top of the first catalytic coating. Filter substrate 100 may include, for example, one or more of metal foils, metals foams, and metal ridges. In still other embodiments, the filter substrate may include ceramics or other materials and structures (or microstructures) that inhibit the path of particulate matter but do not completely enclose the exhaust gas and force it through a porous path. Various microstructures may be utilized that are ordered or random in nature. Further still, the structures may be arranged in strata or layers.

First catalytic coating 101 layered on the filter substrate may include, for example, an oxygen storage catalyst (OSC). The oxygen storage catalyst may be based on cerium. Alternatively, the catalyst may be based on manganese, iron, or any other suitable material that has been optimized for PM combustion. Second catalytic coating 102 layered on the first catalytic coating may include, for example, a three-way catalyst (TWC). In still other embodiments, the second catalytic coating may include a combination of the three-way catalyst and the oxygen storage catalyst to further aid in soot combustion. In a still further embodiment, the filter substrate may include a single catalytic coating comprising a single layer of a three-way catalyst having a very high oxygen-storage catalyst content. For example, the catalyst coating may include a homogeneous single layer three way catalyst having an oxygen storage catalyst content of between 800 and 2000 micromoles of oxygen (O) per cubic inch of catalyst, or between 13 and 32 mg $O/in^3$.

In some embodiments, a pressure sensor (not shown) may be coupled to PM filter 22 to provide an estimate of the backpressure generated therein, as well as an estimate of the filter load. In still other embodiments, pressure sensors may be coupled upstream and downstream of the filter, and the filter load may be based on the estimated pressure difference across the filter.

Engine 10 may receive fuel from fuel tank 20 along fuel line 60. Fuel tank may hold a plurality of fuel or fuel blends, such as, gasoline, fuel with a range of alcohol concentrations, various gasoline-ethanol fuel blends (e.g., E10, E85), and combinations thereof. Still other fuels may include gaseous fuels, such as compressed natural gas (CNG), liquefied petroleum gas (LPG), butane, propane, and oxygenated gaseous or liquid fuels such as dimethylether (DME), methanol and ethanol. Further still, liquid fuels used may include oxygenates and may also include gaseous fuels such as butane, propane (LPG), CNG, DME, and mixtures thereof.

Fuel tank 20 may include a fuel pump 21 for pressurizing fuel delivered to the injectors of engine 10, such as example injector 66. While only a single injector 66 is depicted, additional injectors are provided for each cylinder 30. In one example, where engine system 8 is configured for direct injection, injector 66 may be a direct fuel injector. In an alternate embodiment, where engine system 8 is configured for port injection, injector 66 may be a port fuel injector. In still other embodiments, each cylinder may include one or more injectors including a direct injector and a port injector. One or more valves (not shown) may be coupled to engine system 8 to regulate the supply of fuel from fuel tank 20 to injector 66. In some embodiments where both direct fuel injection and port fuel injection are available, two different fuels may be advantageously used. For example, the engine may be started with a first fuel (e.g., gasoline or diesel) via the injectors, and then a second fuel (e.g., CNG or an alternate fuel that is difficult to start the engine with) may be port injected or fumigated into the engine.

As such, direct injection of fuel provides multiple advantages during high load conditions. For example, introducing oxygenated, liquid fuels with direct injection and high heat of vaporization at high load provides charge cooling for increased air charge, dilution for combustion temperature control, and knock resistance. Further still, direct injection provides come control of pre-ignition (pinking) and therefore enables higher compression ratios to be used with thermodynamic benefits on fuel economy. However, the diffuse flame propagation of direct injected systems may also generate more particulate matter emissions (or soot) due to the fuel not mixing adequately with air prior to combustion. In addition, the relatively late direct injection of fuel may contribute to soot formation due to insufficient time for mixing of the injected fuel with air in the cylinder. Similarly, the injected fuel may encounter less turbulence when flowing through the valves. Consequently, there may be pockets of rich combustion that may generate soot locally. Thus, by flowing engine exhaust gas over the downstream particulate matter filter before releasing exhaust gas to the atmosphere, soot generated in a direct injected engine may be captured in the filter and the quality of exhaust emissions may be improved.

Figure 3:
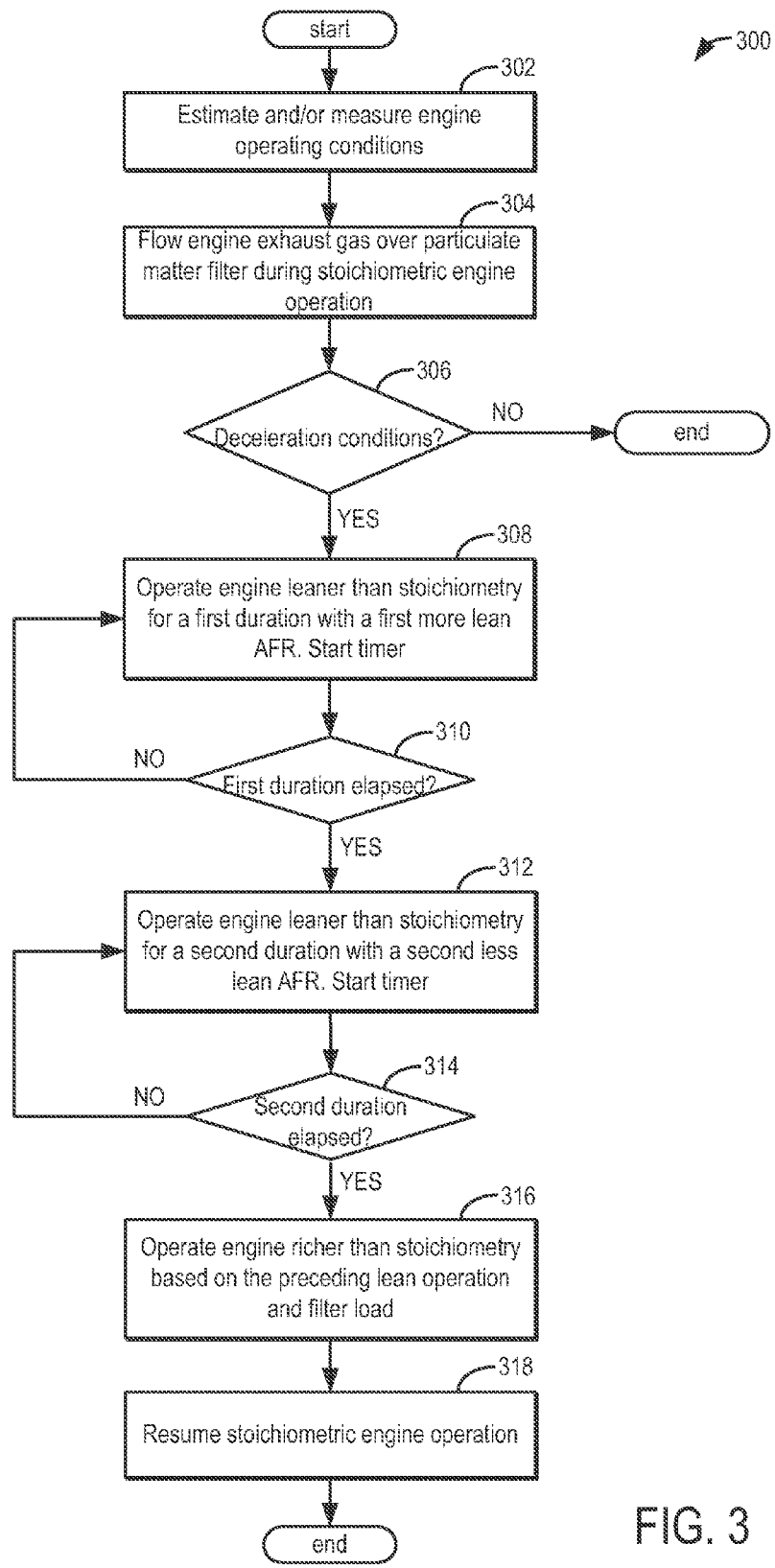
FIG. 3 shows a high level flow chart for periodically operating an engine leaner than stoichiometry so as to passively regenerate the particulate matter filter of FIG. 1.
Figure 4:
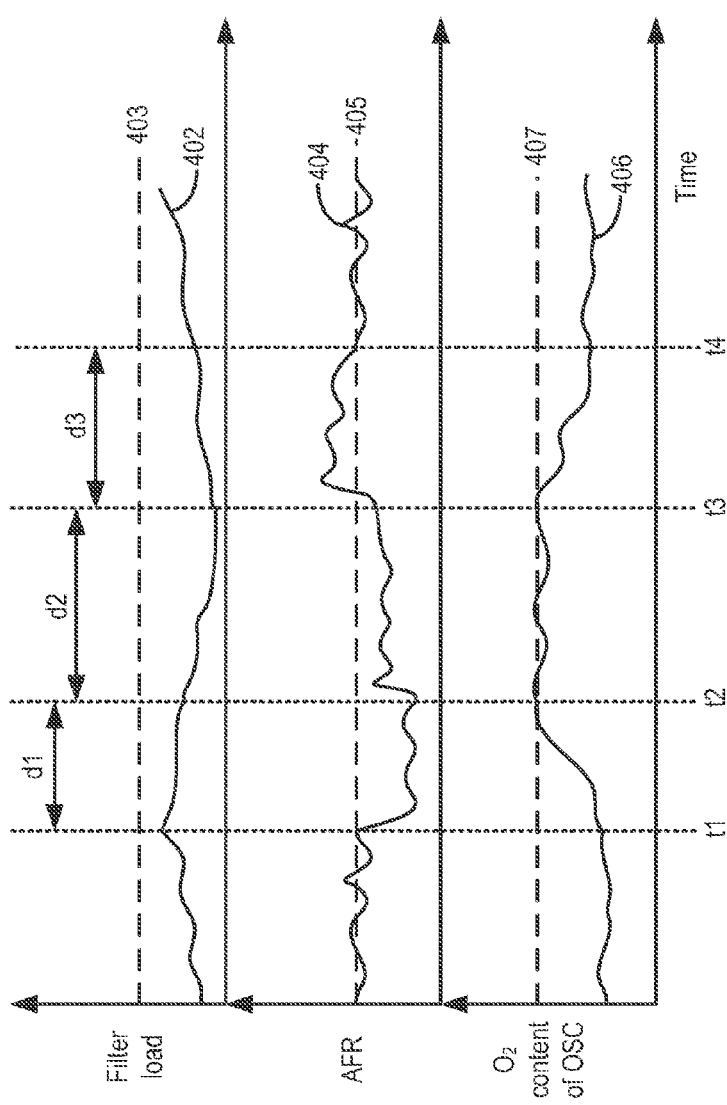
FIG. 4 shows an example lean engine operation according to the present disclosure.

As elaborated with reference to FIG. 3, during selected conditions, the engine may be temporarily operated leaner than stoichiometry to passively regenerate PM filter 22. Specifically, engine operation may be calibrated to give appropriate periodic lean operation over a first, shorter period of strongly lean conditions followed by a second, longer period of slightly lean conditions to oxidize the oxygen storage catalyst (OSC) of the first catalytic coating (over the first phase) and then combust the stored soot using the OSC (over the second phase). This approach allows the filter to be regenerated while reducing detrimental effects on engine torque and vehicle driveability characteristics.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, pressure sensors coupled to PM filter 22 (not shown), and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injector 66, throttle 62, and fuel pump 21. The control system 14 may include a controller 12. The controller may receive input data from the various sensors, process the input data, and trigger the actuators in response to the processed input data based on instruction or code programmed therein corresponding to one or more routines. An example control routine is described herein with reference to FIG. 3.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. It will be appreciated that while engine 10 is shown as a reciprocating engine with pistons, in alternate embodiments, engine 10 may be configured with rotary designs.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 126 is shown coupled to exhaust passage 148 upstream of emission control device 70. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 70 may be a three way catalyst (TWC), NOx filter, various other emission control devices, or combinations thereof. Emission control device 70 may be positioned downstream of particulate matter filter 22, as previously elaborated in FIG. 1. However, in an alternate embodiment, emission control device 70 may be positioned upstream of particulate matter filter 22. As such, having a three way catalyst downstream of the PM filter may improve control of gaseous pollutant emissions since the air-to-fuel ratio is maintained closer to stoichiometry because of the high oxygen storage catalyst content on the filter.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 126. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion chamber 30. While FIG. 2 shows injector 166 as a side injector, it may also be located overhead of the piston, such as near the position of spark plug 192. Alternatively, the injector may be located overhead and near the intake valve to improve mixing. Fuel may be delivered to fuel injector 166 from a high pressure fuel system 172 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 12 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

As described above, FIG. 2 shows only one cylinder of a multi-cylinder engine 10, however each cylinder may similarly include its own set of intake/exhaust valves, fuel injector, spark plug, etc.

In this way, the system of FIGS. 1-2 enables a method comprising, during stoichiometric engine operation, flowing exhaust gas over a filter having a catalyst coating to capture the exhaust PMs before expelling the exhaust gas to the atmosphere. Then, during selected conditions, the method further comprises, shifting engine operation to leaner than stoichiometry including a first shorter and more lean phase followed by a second longer and less lean phase, the lean operation based on a catalyst oxygen content and filter particulate matter load. That is, lean exhaust gas may be periodically flown over the PM filter to passively regenerate the filter.

Now turning to FIG. 3, an example routine 300 is shown for adjusting engine operations to enable exhaust PM storing in a PM filter, and periodic passive regeneration of the filter.

At 302, the method includes, estimating and/or measuring vehicle engine operating conditions. These may include, for example, engine speed, torque demand, boost level, engine temperature, exhaust temperature, barometric pressure, fuel octane content, fuel composition (e.g., fuel alcohol content), particulate filter load, etc. At 304, the method includes flowing exhaust gas over the particulate matter filter during engine operation (e.g., during engine stoichiometric operation), to store particulate matter in the filter.

At 306, vehicle deceleration conditions may be confirmed else the routine may end. For example, it may be confirmed that a brake pedal has been applied, an accelerator pedal has been released, torque demand has been reduced, and/or engine speed is decreasing. If vehicle deceleration conditions are confirmed, then at 308 to 314, the method includes, shifting engine operation to leaner than stoichiometry. In particular, during deceleration conditions, the engine may be selectively operated leaner than stoichiometry for each for a first lean phase (at 308-310) and a second lean phase (at 312-314), wherein the first lean phase immediately precedes the second lean phase and the phases are contiguous. As such, for the lean regeneration operation to occur, the temperature of the exhaust gas and the PM filter (during the deceleration conditions) may need to be above a threshold temperature. As such, in the absence of any catalyst, in air, regeneration of the filter may require a temperature of around 550° C. to burn the stored soot. Herein, by using a catalyst, the combustion temperature of the PMs in contact with the catalyst can be reduced.

The lean engine operation may include, at 308, operating the engine leaner than stoichiometry for a first shorter and more lean phase, specifically, for a first duration with a first more lean (than stoichiometry) air to fuel ratio. A timer may be started when the first lean phase is initiated. At 310, it may be confirmed that the first duration of more lean operation has elapsed. If yes, the routine may proceed to 312 wherein the lean operation includes, operating the engine leaner than stoichiometry for a second longer and less lean phase, specifically, for a second duration that is shorter than the first duration and with a second less lean (than stoichiometry) air to fuel ratio. A timer may be started when the second first lean phase is initiated and at 314, it may be confirmed that the second duration of less lean operation has elapsed before the routine proceeds to 316.

As such, the lean engine operation may be adjusted based on a catalyst oxygen content of the particulate matter filter and a filter particulate matter load. In particular, the first duration of the first lean phase may be adjusted based on the oxygen content of an oxygen storage catalyst included in the first catalytic coating of the PM filter. Alternatively, the first duration may be based on a total oxygen content of the oxygen storage catalyst in the PM filter (such as when an oxygen storage catalyst is present in each coating of the catalyst). As an example, the first duration may be increased as the oxygen content of the first oxygen storage catalyst decreases. As such, the first duration may be adjusted to increase or maintain the oxygen content of the first catalyst above a threshold oxygen content. The second duration of the second lean phase may then be adjusted based on the PM load of the filter, and further based on the first duration. For example, the second duration may be increased as the particulate matter load of the filter increases. As such, the second duration may be a duration required to bring the particulate matter load of the filter below a threshold load.

In some embodiments, the lean engine operation may be further adjusted based on an alcohol content of the fuel injected into the engine. For example, as the alcohol content of the injected fuel increases, the degree of leanness of the lean phase may be increased (e.g., of the first or second lean phase).

It will be appreciated that while the routine of FIG. 3 depicts the lean engine operation in response to vehicle deceleration conditions, in alternate embodiments, the lean engine operation may be responsive to other selected conditions. For example, a forced lean engine operation may be performed during selected steady-state highway driving conditions where the loss of power would not be noticed by the driver. These may include, for example, steady-state highway driving conditions other than cold-start or acceleration. As still another example, the lean regeneration operation may occur periodically when the temperature of the exhaust gas and the PM filter is above a threshold temperature.

At 316, after the lean engine operation, the routine includes operating the engine richer than stoichiometry. As such, the rich operation enables the oxygen storage level of the PM filter's catalyst coating to be reestablished. A duration and degree of richness of the rich operation may be adjusted based on the preceding lean operation and filter load. Following the rich engine operation, at 318, stoichiometric engine operation may be resumed.

It will be appreciated that the lean engine operation described above may be performed while a filter load is below a threshold so as to passively regenerate the particulate matter filter. As such, this may reduce the need for active regeneration. However, in response to the filter load being higher than the threshold, the filter may be actively regenerated. For example, the filter may be actively regenerated via chemical means using a fuel injected over a precious metal pre-catalyst or via external means such as electrical heating. As another example, spark retard, late fuel injection into the engine, and into the exhaust may also be used, under lean (or non-rich) conditions, to increase the exhaust gas temperature to achieve filter regeneration.

It will be appreciated that during the passive filter regeneration, the emission control system must be calibrated to maintain control of legislated gaseous emissions. For example, hydrocarbons and carbon monoxide can be removed by the catalyzed PM filter. In addition, a functioning three way catalyst (TWC) may be needed for NOx control. In one embodiment, having a TWC (e.g., in emission control device 70) downstream of the PM filter may be advantageous because air/fuel variations can be minimized to enable the TWC to provide NOx control. In one example, this may be achieved by not completely oxidizing the OSC in the PM filter. For example, the OSC may not be oxidized it along its entire length. This may be achieved by curtailing oxygen breakthrough from the catalyst/OSC in the filter, for example, by positioning an oxygen sensor after the filter, or by calculating (or predicting) a time of lean exposure based on several engine operating parameters.

In this way, a periodic leaning of engine operation may be used for sufficient passive regeneration of a PM filter. By opportunistically using lean engine operation during selected engine conditions to passively regenerate the filter, the filter load may reduce without adversely affecting engine driveability.

Now turning to FIG. 4, map 400 depicts an example lean engine operation that may be used to passively regenerate the PM filter of FIG. 1. Map 400 depicts a particulate matter filter load at 402, changes in an engine operational air to fuel ratio (AFR) at 404, and changes in an oxygen content of catalyst layered on the filter at 406.

Before t1, the engine may be operating with an AFR that is substantially at stoichiometry 405. During the stoichiometric engine operation, the engine exhaust may be flowed over the PM filter so that exhaust PMs may be captured and stored in the PM filter and not released into the atmosphere. Accordingly, the filter load (at 402) may be gradually increasing between t0 and t1. At t1, selected engine conditions may be present that warrant a relatively lean engine operation. For example, the vehicle in which the engine is included may be decelerating. Accordingly, at t1, the engine lean operation may be adjusted so that the engine is selectively operated leaner than stoichiometry (at 404) for each of a first lean phase between t1 and t2, and a second lean phase between t2 and t3.

The first lean phase may be based on an oxygen content (at 406) of a first filter catalyst coating layered on the filter substrate. In particular, a first duration d1 of the first lean phase may be adjusted so that the oxygen content of an oxygen storage catalyst of the first catalyst coating is increased to or above a threshold oxygen content 407. In addition, during the first lean phase, some PMs stored on the filter may be combusted so that the filter load is decreased a little. A second duration d2 of the second lean phase may then be based on the first duration d1 and the filter load 402. For example, the second lean phase may be adjusted to reduce (or maintain) the filter load below a threshold load 403. In particular, during the second lean phase, the oxidized filter catalyst may more extensively combust the remaining stored soot on the filter so substantially lower the filter load. As such, the first duration d1 of the first lean phase is shorter than duration d2 of the second lean phase. However, the first lean phase is more lean than the second phase, as indicated by a leaner than stoichiometry AFR of the first lean phase as compared to the AFR of the second phase. In addition, it will be appreciated that during the entire lean operation (between t1 and t3), the filter load may be lower than a threshold level 403 that is required to trigger an active regeneration routine. That is, the lean engine operation of FIG. 4 enables the filter to be passively regenerated. However, in alternate embodiments, in response to the filter load exceeding threshold level 403, an active regeneration of the filter may be performed with the addition of fuel and air to raise exhaust temperatures to levels that enable the stored soot to be combusted.

At t3, after the lean operation has been completed, engine operation may be temporarily shifted to richer than stoichiometry (at 404) for a duration d3. Herein, the degree of richness and duration d3 of the rich operation is based on the duration (d1 and d2) and the degree of leanness (lean AFR between t1 and t2, and t2 and t3) of the preceding lean operation. As such, the temporary rich engine operation enables the oxygen content of the filter catalyst to be restored to levels that were present before the temporary lean engine operation.

In this way, lean engine operating conditions may be advantageously used to passively regenerate a particular matter filter. By passively regenerating the filter during periods of engine enleanment, the need for active regeneration of the filter may be reduced, thereby improving fuel economy and engine performance. In addition, over-temperature related component degradation may be reduced while without degrading filter regeneration efficiencies.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during stoichiometric engine operation, flowing exhaust gas over a filter having a catalytic coating; and
during selected conditions, operating at least one actuator via a controller to shift engine operation to leaner than stoichiometry lean operation including a first shorter and more lean phase followed by a second longer and less lean phase, the lean operation adjusted via the controller based on a catalyst oxygen content and a filter particulate matter load.

2. The method of claim 1, wherein the catalytic coating is a first catalytic coating layered on a substrate of the filter, the first catalytic coating including an oxygen storage catalyst.

3. The method of claim 2, wherein the filter further includes a second catalytic coating layered on top of the first catalytic coating, the second catalytic coating including a three-way catalyst.

4. The method of claim 3, wherein the lean operation adjustment includes adjusting a first duration of the first lean phase based on the oxygen content of the oxygen storage catalyst, and adjusting a second duration of the second lean phase based on the particulate matter load of the filter.

5. The method of claim 4, wherein the adjusting includes increasing the first duration as the oxygen content of the oxygen storage catalyst decreases, and increasing the second duration as the particulate matter load of the filter increases.

6. The method of claim 5, wherein the second duration is a duration required to bring the particulate matter load of the filter below a threshold load.

7. The method of claim 1, wherein an engine is included in a vehicle, and wherein the selected conditions include vehicle deceleration conditions.

8. The method of claim 1, wherein the filter is not a wall flow filter.

9. The method of claim 1, wherein the filter is an open flow filter including one or more of metal foils and metal foams.

10. The method of claim 1, further comprising, after the lean operation, operating an engine richer than stoichiometry, a duration and degree of richness of the richer than stoichiometry operation based on the lean operation and the filter load to increase the catalyst oxygen content above a threshold content.

11. The method of claim 1, wherein the lean operation is further adjusted based on an alcohol content of a fuel injected into an engine.

12. The method of claim 1, wherein the catalytic coating includes a homogeneous single layer three way catalyst having an oxygen storage catalyst content of between 13 and 32 mg $O/in^3$.

13. A method for a vehicle, comprising:
flowing exhaust gas over a filter to store particulate matter; and during deceleration conditions, operating at least one actuator via a controller to selectively operate an engine leaner than stoichiometry for each of a first and second lean phase, the first lean phase shorter and more lean than the second lean phase, the first lean phase based on an oxygen content of a filter catalyst coating, the second lean phase based on a filter load of the filter.

14. The method of claim 13, wherein the first lean phase precedes the second lean phase, and wherein the first and second lean phases are contiguous.

15. The method of claim 13, wherein the filter catalyst coating includes a first oxygen storage catalyst coating layered on the filter, and a second three-way catalyst coating layered on the first oxygen storage catalyst coating.

16. The method of claim 15, wherein a first duration of the first lean phase is adjusted to increase the oxygen content of the first oxygen storage catalyst coating above a threshold oxygen content.

17. The method of claim 16, wherein a second duration of the second lean phase is adjusted to decrease the filter load below a threshold load, and wherein the second duration is further based on the first duration of the first lean phase.

18. The method of claim 17, further comprising, after lean operation, operating the engine richer than stoichiometry, a duration and degree of richness of the richer than stoichiometry operation based on the lean operation and the filter load.

* * * * *